United States Patent
Naveh

(10) Patent No.: US 9,681,166 B2
(45) Date of Patent: Jun. 13, 2017

(54) TECHNIQUES FOR EMOTION DETECTION AND CONTENT DELIVERY

(71) Applicant: Facebook, Inc., Menlo Park, CA (US)

(72) Inventor: Barak Reuven Naveh, Palo Alto, CA (US)

(73) Assignee: FACEBOOK, INC., Menlo Park, CA (US)

( * ) Notice: Subject to any disclaimer, the term of this patent is extended or adjusted under 35 U.S.C. 154(b) by 251 days.

(21) Appl. No.: 14/189,467

(22) Filed: Feb. 25, 2014

(65) Prior Publication Data

US 2015/0242679 A1 Aug. 27, 2015

(51) Int. Cl.
*G06K 9/00* (2006.01)
*H04N 21/262* (2011.01)
*H04N 21/442* (2011.01)

(52) U.S. Cl.
CPC ....... *H04N 21/262* (2013.01); *G06K 9/00302* (2013.01); *H04N 21/44218* (2013.01)

(58) Field of Classification Search
CPC .............. G06K 9/00335; H04N 21/262; G06F 17/2785; G06F 17/28
See application file for complete search history.

(56) References Cited

U.S. PATENT DOCUMENTS

| | | | |
|---|---|---|---|
| 9,137,558 B2* | 9/2015 | Gibbon | H04N 21/42201 |
| 2003/0182123 A1* | 9/2003 | Mitsuyoshi | 704/270 |
| 2006/0036751 A1* | 2/2006 | Garbow et al. | 709/229 |
| 2011/0134026 A1* | 6/2011 | Kang | G06F 3/011 345/156 |
| 2011/0142413 A1* | 6/2011 | Kang | A61B 5/165 386/234 |
| 2012/0324494 A1* | 12/2012 | Burger | H04H 60/33 725/12 |
| 2013/0132203 A1* | 5/2013 | Cheng | 705/14.58 |
| 2014/0095150 A1* | 4/2014 | Berjikly | G06F 17/2785 704/9 |
| 2014/0366049 A1* | 12/2014 | Lehtiniemi | H04N 21/44218 725/12 |

* cited by examiner

*Primary Examiner* — Amara Abdi

(57) ABSTRACT

Techniques for emotion detection and content delivery are described. In one embodiment, for example, an emotion detection component may identify at least one type of emotion associated with at least one detected emotion characteristic. A storage component may store the identified emotion type. An application programming interface (API) component may receive a request from one or more applications for emotion type and, in response to the request, return the identified emotion type. The one or more applications may identify content for display based upon the identified emotion type. The identification of content for display by the one or more applications based upon the identified emotion type may include searching among a plurality of content items, each content item being associated with one or more emotion type. Other embodiments are described and claimed.

15 Claims, 10 Drawing Sheets

TECHNIQUES FOR EMOTION DETECTION AND CONTENT DELIVERY

BACKGROUND

Users of computing devices spend increasing amounts of time browsing streams of posts on social networks, news articles, video, audio, or other digital content. The amount of information available to users is also increasing. Thus, a need exists for delivering content a user that may be of current interest to them. For example, a user's interests may be determined based upon their current emotional state. Computing devices such as laptops, mobile phones, and tablets increasingly include at least one, and often more than one, imaging component, such as a digital camera. Some devices may include a front-facing camera that is positioned on the same side of the device as a display. Thus, during normal operation, a user may be looking towards the imaging component. However, current content delivery systems typically do not utilize passive imaging information. Thus, a need exists for a content delivery solution that takes advantage of available passive imaging data to provide content to a user with improved relevancy.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Various embodiments are direct to techniques for emotion detection and content delivery. In one embodiment, for example, an emotion detection component may identify at least one type of emotion associated with at least one detected emotion characteristic. A storage component may store the identified emotion type. An application programming interface (API) component may receive a request from one or more applications for emotion type and, in response to the request, return the identified emotion type. The one or more applications may identify content for display based upon the identified emotion type. The identification of content for display by the one or more applications based upon the identified emotion type may include searching among a plurality of content items, each content item being associated with one or more emotion type. In addition, a calibration component may be configured to receive a request to calibrate emotion detection and present a type of emotion to a user. The calibration component may utilize the imaging component to detect emotion characteristics and store an association between the presented type of emotion and the detected emotion characteristics in the storage component. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
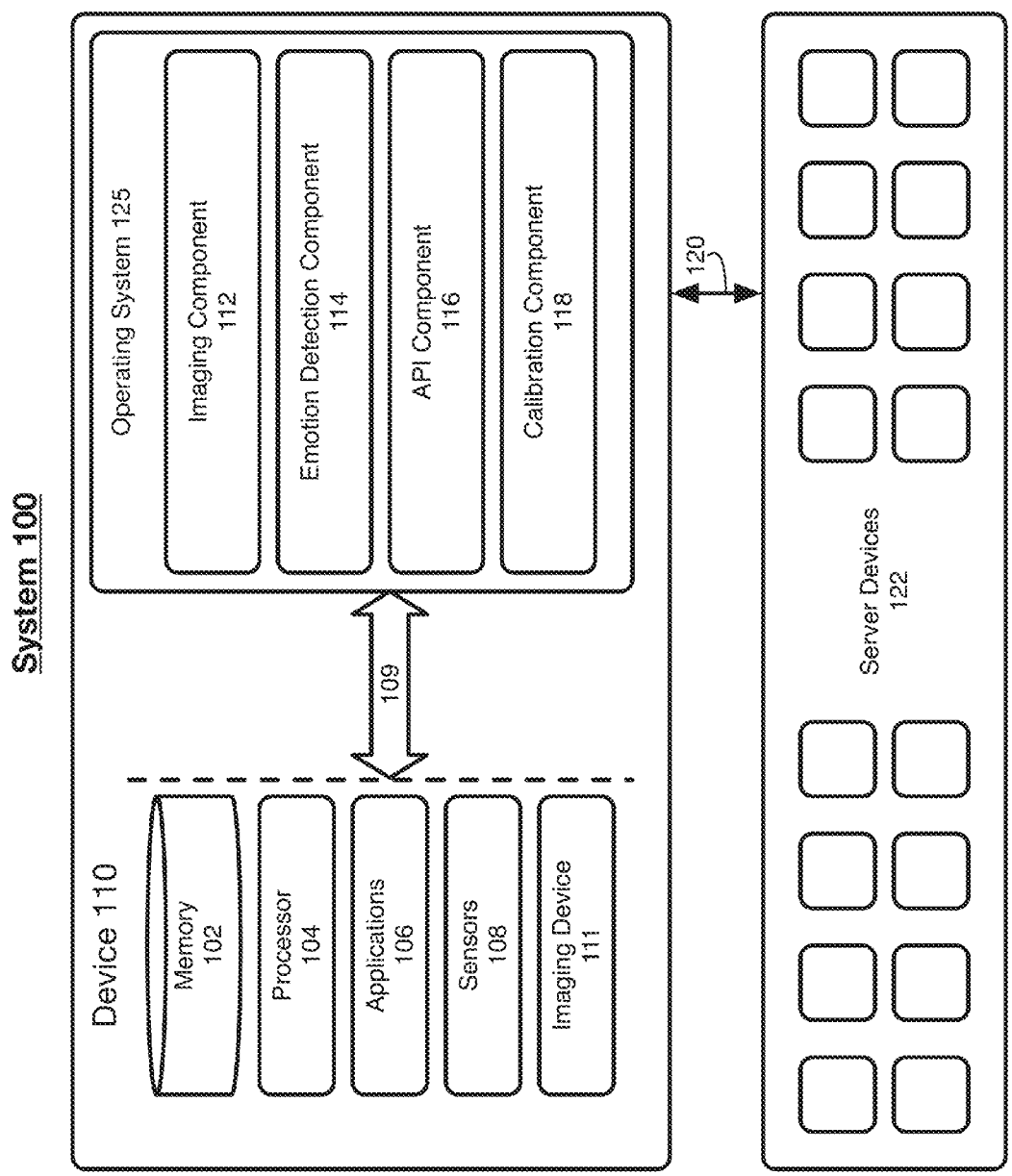
FIG. 1 illustrates an embodiment of a system.

Various embodiments are direct to techniques for emotion detection and content delivery. In one embodiment, for example, an apparatus, such as a mobile device, may comprise a processor circuit on a device and a storage component configured to store types of emotions. An imaging component may be operative on the processor circuit to produce an image using an imaging device. An emotion detection component may be operative on the processor circuit to request the image from the imaging component, detect emotion characteristics from the image, and identify at least one type of emotion from the storage component associated with the detected emotion characteristics. Once detected and identified, an emotion type may be stored, either temporarily for a defined period of time, or permanently in a user profile.

An application programming interface (API) component may be operative on the processor circuit to receive requests for emotion types and, in response to the requests, return a type of emotion. In an embodiment, the apparatus may include one or more applications configured to access the API component. The API component may include one or more functions that may be accessed by applications, such as a function that delivers a most recently detected emotion type. The one or more applications may make requests to the API component for the most recently detected emotion type and display content based upon a received emotion type, for example. In this manner, content delivered to a user may be determined based, in part, on a detected emotion associated with the user, thus improving the relevancy of delivered content. Further, an application may maintain a profile for a user in which emotion information, such as emotion type, may be associated with currently displayed content. In this manner, the application may predictively deliver content to a user based upon detected emotion type.

Content delivery may performed by an application stored on a device, such as a social networking application, or using a browser application, which may access content from the internet. Content may include, but is not limited to, social networking posts, photos, videos, audio, games, advertisements, or applications made available online or through an application store on a device. Of course, one of skill in the art will readily recognize that any digital content available on a device may be used.

In some embodiments, a calibration component may be configured to receive a request to calibrate emotion detection and present a type of emotion to a user. The calibration component may utilize the imaging component and the emotion detection component to detect emotion characteristics and store an association between the presented type of emotion and the detected emotion characteristics in the storage component. Other embodiments are described and claimed.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modifications, equivalents, and alternatives consistent with the claimed subject matter.

FIG. 1 illustrates a block diagram for a system 100. In one embodiment, the system 100 may comprise one or more components. Although the system 100 shown in FIG. 1 has a limited number of elements in a certain topology, it may be appreciated that the system 100 may include more or less elements in alternate topologies as desired for a given implementation. The system 100 may include a device 110, which may be generally operative to interact with server devices 122 over a network interface 120. Device 110 may include one or more processing units, storage units, network interfaces, or other hardware and software elements described in more detail below.

In an embodiment, device 110 may comprise without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a tablet computer, or a wearable computing device such as a smart watch. Server devices 122 may comprise without limitation a server, a server array or server farm, a web server, a network server, an Internet server, a work station, a mini-computer, a mainframe computer, a supercomputer, a network appliance, a web appliance, multiprocessor systems, processor-based systems, or any combination thereof.

In various embodiments, device 110 and server devices 122 may comprise or implement multiple components or modules. As used herein the terms "component" and "module" are intended to refer to computer-related entities, comprising either hardware, a combination of hardware and software, software, or software in execution. For example, a component and/or module can be implemented as a process running on a processor, a hard disk drive, multiple storage drives (of optical and/or magnetic storage medium), an object, an executable, a thread of execution, a program, and/or a computer. By way of illustration, both an application running on a server and the server can be a component and/or module. One or more components and/or modules can reside within a process and/or thread of execution, and a component and/or module can be localized on one computer and/or distributed between two or more computers as desired for a given implementation. The embodiments are not limited in this context.

The various devices within system 100, and components and/or modules within a device of system 100, may be communicatively coupled via various types of communications media as indicated by various lines or arrows. The devices, components and/or modules may coordinate operations between each other. The coordination may involve the uni-directional or bi-directional exchange of information. For instance, the devices, components and/or modules may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections within a device include parallel interfaces, serial interfaces, and bus interfaces. Exemplary connections between devices may comprise network connections over a wired or wireless communications network.

In various embodiments, device 110 and server devices 122 of the system 100 may be organized as a distributed system. A distributed system typically comprises multiple autonomous computers that communicate through a computer network. The computers interact with each other in order to achieve a common goal, such as solving computational problems. For example, a computational problem may be divided into many tasks, each of which is solved by one computer. A computer program that runs in a distributed system is called a distributed program, and distributed programming is the process of writing such programs. Examples of a distributed system may include, without limitation, a client-server architecture, a 3-tier architecture, an N-tier architecture, a tightly-coupled or clustered architecture, a peer-to-peer architecture, a master-slave architecture, a shared database architecture, and other types of distributed systems. It is worthy to note that although some embodiments may utilize a distributed system when describing various enhanced techniques for data retrieval, it may be appreciated that the enhanced techniques for data retrieval may be implemented by a single computing device as well. The embodiments are not limited in this context.

Device 110 may include a memory 102 and processor 104, which may include one or more storage and processing components described in more detail herein. In an embodiment, device 110 may include one or more applications 106. Applications 106 may include, but are not limited to, native mobile applications, web applications, desktop software applications, or any combination thereof. Examples of native mobile applications may include social networking applications, newsreader applications, photography applications, video applications, media applications, search applications, games, e-reading applications, or the like. Applications 106 may communicate over interface 109 with API component 116, which may provide one or more application programming interfaces.

Device 110 may further include sensors 108, which may include accelerometer, temperature, gravity, light, acceleration, magnetic field, orientation, pressure, rotational vector, or other sensors capable of sensing characteristics of a device and its environment. Such sensors may be independent, or integrated into a processing component, such as processor 104, for example. In some embodiments, sensors 108 may be used to detect when a user is looking at a device. For example, an accelerometer, or other combination of sensors, may detect that a device has been picked up and is being held. In this manner, imaging device 111 and imaging component 112 may be triggered to detect emotion, as discussed herein. Such sensors may have lower power requirements than imaging device 111 and imaging component 112. Thus, utilizing sensors 108 to trigger imaging device 111 and imaging component 112 may provide significant savings in power consumption.

In an embodiment, device 110 may include imaging device 111. Imaging device 111 may include one or more image sensors capable of converting optical images into electronic signals. Examples of common imaging devices known in the art include semiconductor charge-coupled devices (CCD) or active pixel sensors in complementary metal-oxide-semiconductor (CMOS) or N-type metal-oxide-semiconductor (NMOS, Live MOS) technologies. One of skill in the art will readily appreciate that any type of imaging device capable of producing electronic signals representing light may be used. In some examples, multiple imaging devices may be included in device 110, for example, a front-facing imaging device and a rear-facing imaging device. In some embodiments, imaging device 111 may be positioned on the front of a device, such as the front panel of a mobile phone or tablet, or the display of a laptop computer.

In various embodiments, memory 102, processor 104, applications 106, sensors 108, and imaging device 111 may communicate with operating system 125 via interface 109. Interface 109 may comprise an internal bus, for example, or any other interface for communication as described herein. Operating system 125 may comprise a collection of software components and modules operative to interact and manage hardware components, provide a user interface for device 110, and provide services, such as APIs, to applications 106. Non-limiting examples of operating systems that may be used by device 110 include Apple iOS®, Apple OS X®, Google Android®, Google Chrome OS®, Microsoft Windows®, or Microsoft Windows Phone®.

Operating system 125 may include various components, which may be implemented in using various software modules. In an embodiment, operating system 125 may include imaging component 112, emotion detection component 114, application programming interface (API) component 116, and calibration component 118. A limited number of components have been illustrated to provide clarity, however, operating system 125 may include additional software components and modules.

Imaging component 112 may be one or more software modules operative to interface with imaging device 111. Imaging component 112 may be configured to accept digital signals from imaging device 111 and translate the digital signals into image information. Image information may include compressed or uncompressed image data, which may be analyzed by an emotion detection component 114. Some examples of imaging formats that may be used include BMP, GIF, JPG, PNG, TIFF, or ISO 12234-2, TIFF/EP raw image format; however, other image formats may be used.

Imaging component 112 may be operative to send image information to other components or applications of device 110. In an embodiment, imaging component 112 may be configured to send image information to emotion detection component 114. In an example, imaging component 112 may be triggered by one or more sensors 108 and, in response, may initialize imaging device 111, retrieve imaging information therefrom, and send the imaging information to emotion detection component 114. Imaging information may include emotion characteristics, which may be identified by emotion detection component 114, as discussed herein.

Operating system 125 may further include emotion detection component 114. Emotion detection component 114 may include one or more software modules capable of detecting emotions, expressions, or other characteristics of a user from image information. For example, image information received from imaging component 112 may include emotion characteristics that may be parsed by emotion detection component 114. In some embodiments, particular characteristics of an image may signify emotion or expression. By way of example and not limitation, an emotion characteristic may indicate feelings, moods, or expressions that can be categorized into types of emotions. Types of emotions may include emotions or expressions such as a smile, joy, humor, amazement, excitement, surprise, a frown, sadness, disappointment, confusion, jealously, indifference, boredom, anger, depression, or pain. In addition, types of emotions may include other characteristics of a user, such as whether a user is looking at a device or away from a device. Over a period of time, emotion detection module 114 may determine a user's interest in displayed content using a combination of detected emotion types. In this manner, a type of emotion may be associated with viewed content and content displayed to the user may be customized based upon emotion type.

In an embodiment, operating system 125 may include API component 116. API component 116 may provide an interface for communication between applications, such as applications 106, and operating system 125. Communication may take place over interface 109, for example. In an embodiment, applications 106 may utilize an API to request information from one or more components of operating system 125, such as emotion detection component 114. In an embodiment, API component 116 may provide an interface such that one or more applications 106 may request a currently detected, or last detected, emotion type identified by emotion detection component 114. In this manner, an application may associate content currently being displayed to a user with a detected type of emotion for the user. Further, a profile may be created associating content with types of emotion, allowing applications to provide content based upon a detected emotion type.

In some embodiments, a calibration component 118 may be included in operating system 125. Calibration component 118 may be used to calibrate, or fine-tune, emotion detection component 114. For example, once initialized, calibration component 118 may initialize imaging component 112 and imaging device 111. Calibration component 118 may access a list of emotion types from a storage module, such as memory 102 or server devices 122, and display an emotion type on a user interface. The display may ask a user to express the displayed emotion and emotion detection component 114 may receive emotion characteristics from imaging device 111. Emotion characteristics may be associated with displayed emotion types in a user profile, which may be stored in memory 102 or in one or more server devices 122. In this manner, a user's individual emotion characteristics may be associated with each emotion type, improving the accuracy of emotion detection component 114.

In various embodiments, server devices 122 may include one or more web servers, content servers, storage servers, or other server devices as described herein. Server devices 122 may be accessed by device 110 via network interface 120. For example, one or more applications 106 or components, such as emotion detection component 114 may access server devices 122 via network interface 120. In an example, server devices 122 may provide a content delivery system for digital content in the form of photos, videos, articles, or status updates from a social network. In an exemplary embodiment, a social networking application on device 110 may request an emotion type via API component 116. Based upon a received emotion type, the social networking application may request particular content for display from server devices 122. In addition, the social networking application may store an association between currently displayed content and a received emotion type in a user profile, either locally or using server devices 122. In this manner, new content may be delivered to the user based upon a currently detected type of emotion.

Figure 2:
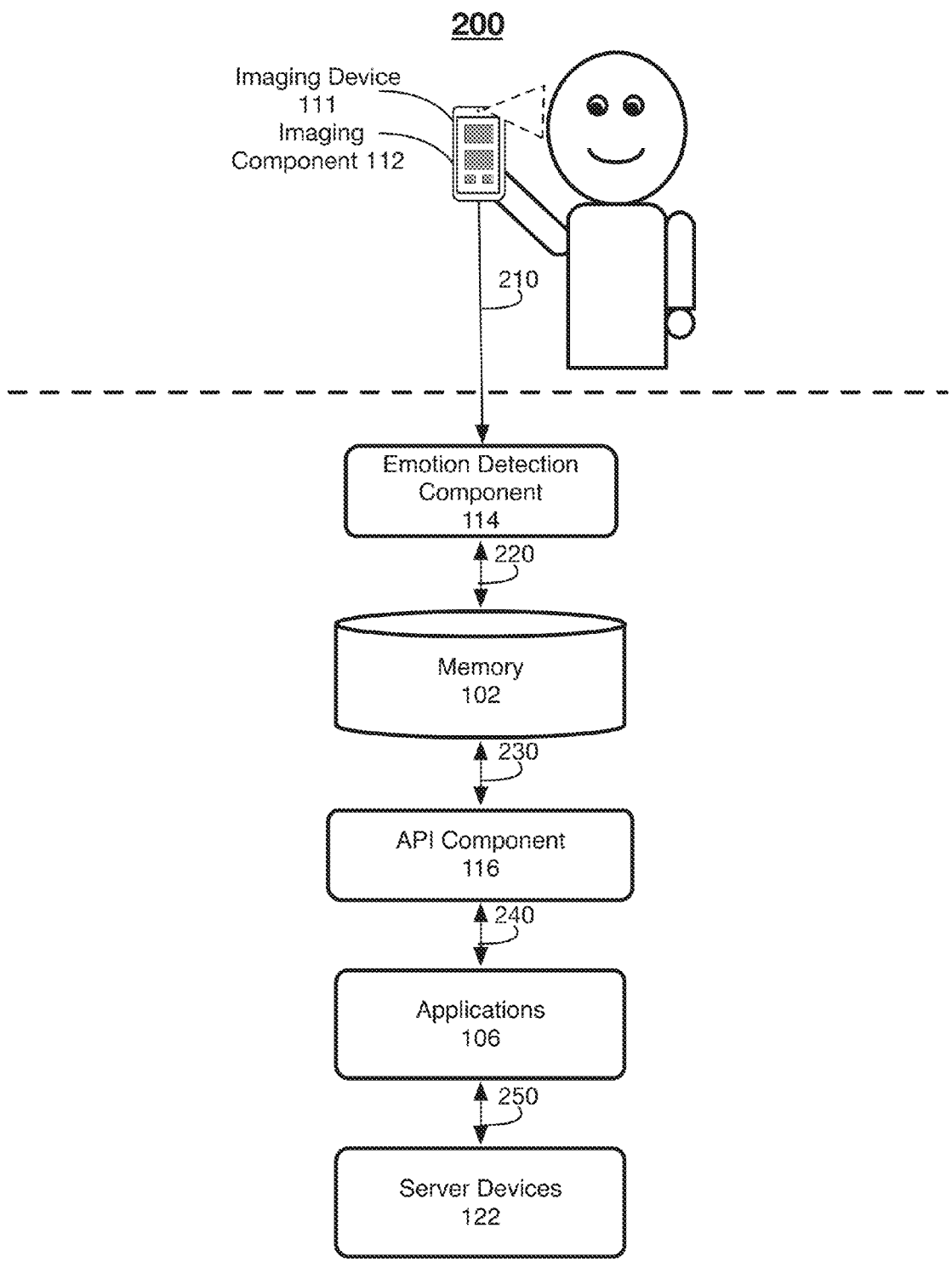
FIG. 2 illustrates a data flow.

FIG. 2 illustrates a data flow 200 for detecting emotion and delivering content according to an embodiment. Data flow 200 illustrates the detection of emotion using elements from system 100, as described above. For example, imaging device 111 may capture image data of a user and imaging component 112 may produce an image 210, which may be transmitted to emotion detection component 114. As described above, emotion detection component 114 may detect emotion characteristics from image 220 and access memory 102, or remotely access server devices 122, which may include a plurality of emotion types. Emotion detection component 114 may identify an emotion type associated with detected emotion characteristics and store the identified emotion type in memory 102.

In an exemplary embodiment, detected emotion types may be stored temporarily for a defined period of time, or permanently. Further, detected emotion types may be stored in a secure area of memory 102 such that access to detected emotion types may only be performed using API component 116. For example, an operating system may provide privacy settings for a user, which enables a user to opt-in or opt-out of emotion detection. API component 116 may be configured to only provide emotion type information when a user has opted-into emotion detection.

In an embodiment, API component may provide an interface to access memory 102 and retrieve an emotion type 230 in response to an application request 240. In this manner, applications 106 may associate content currently being display to a user with a detected type of emotion for the user. Further, a user profile may associate content with types of emotion, allowing applications to provide content based upon a detected emotion type. For example, applications 106 may request content 250 from server devices 122 based upon emotion type 230. In addition, applications 106 may store an association between currently displayed content and a detected emotion type. Such an association may be stored locally, or remotely, and may be used for content delivery.

Operations for the above-described embodiments may be further described with reference to one or more logic flows. It may be appreciated that the representative logic flows do not necessarily have to be executed in the order presented, or in any particular order, unless otherwise indicated. Moreover, various activities described with respect to the logic flows can be executed in serial or parallel fashion. The logic flows may be implemented using one or more hardware elements and/or software elements of the described embodiments or alternative elements as desired for a given set of design and performance constraints. For example, the logic flows may be implemented as logic (e.g., computer program instructions) for execution by a logic device (e.g., a general-purpose or specific-purpose computer). For example, a logic flow may be implemented by a processor component executing instructions stored on an article of manufacture, such as a storage medium. A storage medium may comprise any non-transitory computer-readable medium or machine-readable medium, such as an optical, magnetic or semiconductor storage. The storage medium may store various types of computer executable instructions, such as instructions to implement one or more disclosed logic flows. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The embodiments are not limited in this context.

Figure 3:
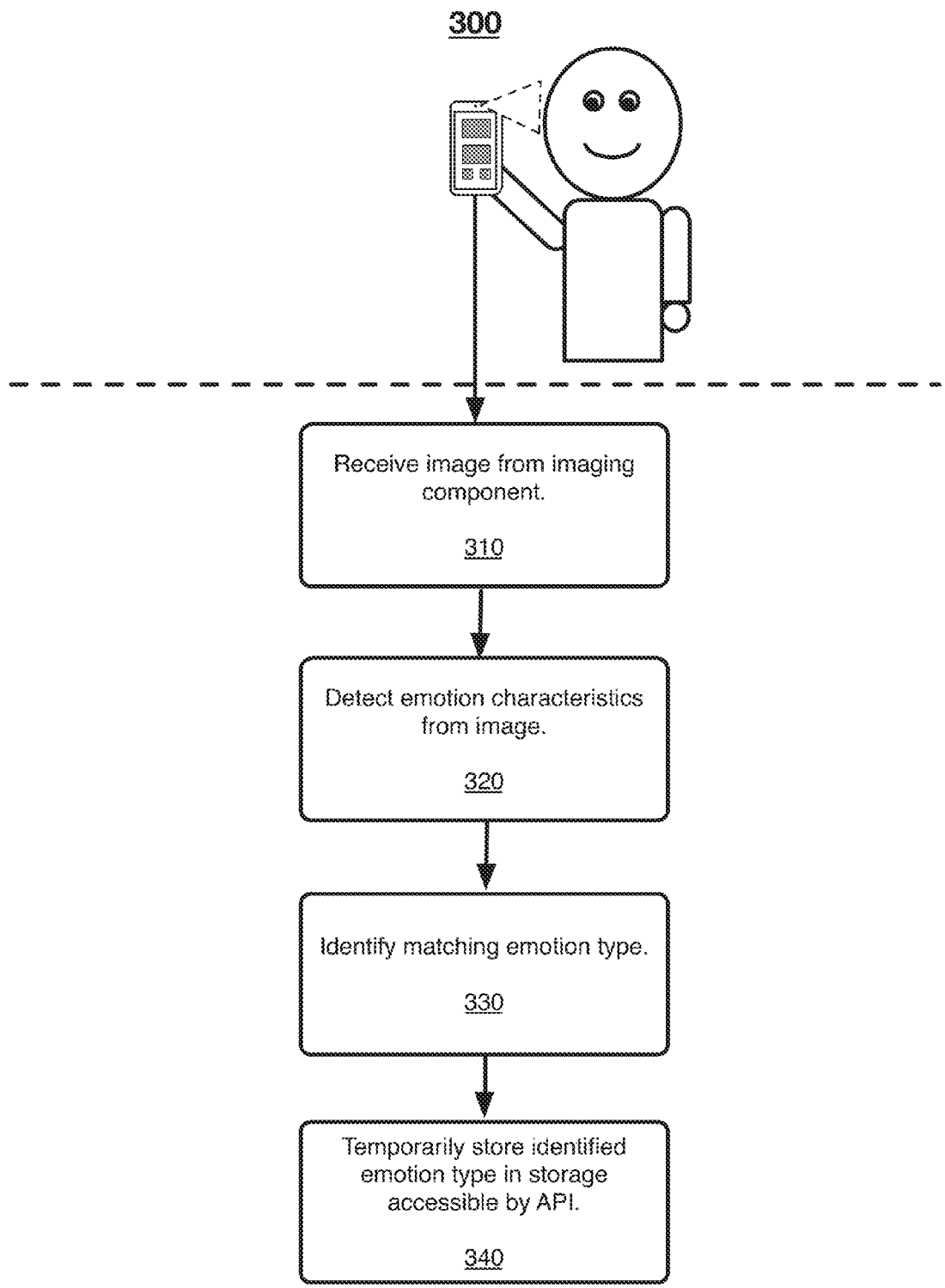
FIG. 3 illustrates a logic flow according to an embodiment.

FIG. 3 illustrates one embodiment of a logic flow 300. The logic flow 300 may be representative of some or all of the operations executed by one or more embodiments described herein. For instance, the logic flow 300 may be representative of some or all of the operations executed by system 100, for example.

At 310, an image may be received from an imaging component, such as imaging component 112 described above. The image may be produced from digital signals received from an imaging device, such as a camera on a device. As described above, in an embodiment, one or more sensors of a mobile device may trigger a front-facing camera of the mobile device. Once triggered, an image device may capture digital signals, which are used by an imaging component to produce an image.

At 320, emotion characteristics may be detected from the image. One or more software modules operative to detect emotion characteristics may be used. For example, one of many well-known techniques for detecting emotion characteristics may be used. Such algorithms may be configured to detect various emotions, as described above, and match detected emotion characteristics with stored emotion types at 330. Emotion types may include emotions or expressions, for example, a smile, joy, humor, amazement, excitement, surprise, a frown, sadness, disappointment, confusion, jealously, indifference, boredom, anger, depression, or pain. In addition, emotion characteristics may indicate whether a user is looking at a device or away from a device, which may be included as emotion types. Over a period of time, an emotion detection module may determine a user's interest in displayed content using a combination of detected emotion types. In this manner, a type of emotion may be associated with viewed content.

TABLE 1

| Emotion Characteristics | Emotion Type |
| --- | --- |
| A, B | Happy |
| D | Bored |
| C, D | Sad |
| E | Looking away |
| F | Looking at device |

As illustrated in exemplary Table 1 above, a variety of emotion characteristics may be associated with emotion types. Such a table may be stored as a database, or other data structure, in a storage medium, such as memory 102 or server devices 122. In the exemplary table, characteristics have been represented by variables, however, these characteristics may be represented by data structures generated by an emotion detection algorithm. In the example, emotion characteristics A, B, C, D, E, and F may be used. In an embodiment, emotion characteristic A may be a smile, emotion characteristic B may be wide eyes, emotion characteristic C may be a neutral mouth (not a smile and not a frown), emotion characteristic D may be a lowered brow, emotion characteristic E may indicate a disconnect with the user's eyes, and emotion characteristic F may indicate that a user's eyes are looking at the device. In the example, emotion characteristics A, B may indicate a user is happy. Emotion characteristic D, alone, may indicate boredom while a combination of emotion characteristics C, D may indicate sadness. In this manner, an emotion detection component may use detected emotion characteristics to identify an emotion type.

At 340, an identified emotion type may be stored temporarily such that an API component may provide an interface to access the emotion type. Identified emotion type may be stored in a storage medium, such as memory 102. In some embodiments, identified emotion type may be stored in a secure area of memory 102 that is accessible only by an interface provided by an API component. Temporary storage may be for a brief period of time, such as 30 seconds, or may last longer, such as one day. Further, storage of detected emotion types may be permanent in some cases. A user of a device may be presented with options as to the storage of emotion information. For example, a user may choose to store detected emotion information for a short period, long period, permanently, or not at all. Moreover, in some embodiments, a user may choose to prevent applications from accessing detected emotion information.

Figure 4:
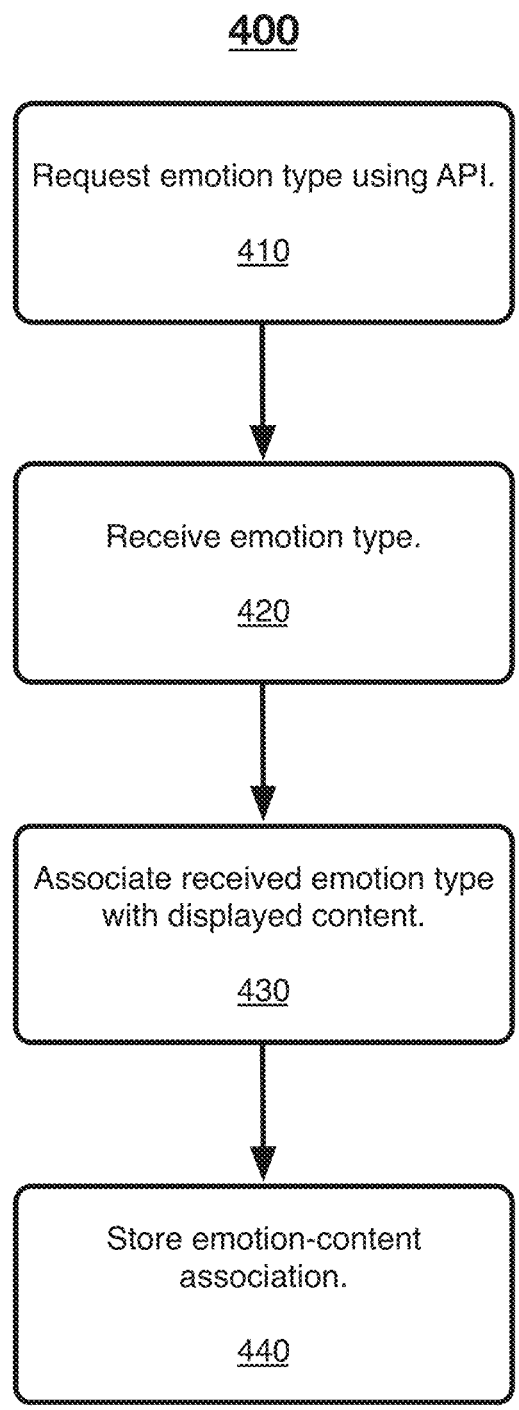
FIG. 4 illustrates a logic flow according to an embodiment.

FIG. 4 illustrates one embodiment of a logic flow 400. The logic flow 400 may be representative of some or all of the operations executed by one or more embodiments described herein. For instance, the logic flow 400 may be representative of some or all of the operations executed by system 100, for example.

At 410, an application may request emotion type information using an API configured to provide an interface between stored emotion type information and one or more applications of a device. An application may receive the requested emotion type at 420. In an embodiment, the application may associate the received emotion type with content currently being displayed, or recently having been displayed, at 430. This association may be stored in a user profile at 440. In another example, an association between a received emotion type and content may be stored separately from a user profile, such as within an object association system. In such an object association system, an edge may be created between an object representing content and an object representing an emotion type. Storage of the association may be done locally or remotely, and may be configured to last for a temporary time period or permanently.

TABLE 2

User: Jason Hurley

| Content ID | Content Type | Posted By | Emotion Type |
|---|---|---|---|
| 18673645 | photo | Jack Smith | Happy |
| 19587454 | article | Kate Higgins | Bored |
| 17658411 | status update | Sawyer Rose | Sad |
| 18596833 | video | Ben Jackson | Looking away |
| 19845536 | ad | Company X | Looking at device |

Table 2 represents an exemplary data structure for storing detected emotions with content. A user profile may be stored locally on a device using a memory such as memory 102, or using a server, such as server devices 122. As illustrated in Table 2, an association may be made between content that has been displayed and a user's emotional or physical response to that content. Of course, this is only an exemplary embodiment and, as discussed above, an association between a received emotion type and content may be stored separately from a user profile, such as within an object association system. In such an object association system, an edge may be created between an object representing content and an object representing an emotion type. As shown in table 2, a user has viewed five different items of content: a photo, an article, a status update, a video, and an ad. As illustrated, each content item includes a unique ID, content type, indication as to who posted the content, and a detected emotion type associated with the user. In this manner, a user's emotional or physical response to content may be collected and used to delivery new content in the future.

In another example, a user may view a series of stories posted on a social network using a native mobile application. As a user scrolls through content, the application may request emotion type information. When a user has chosen a particular photo to view, a current emotion type may be associated with the photo. In an example, a photo of a puppy may be associated with an emotion type of happy. In another example, a photo of an ex-girlfriend may be associated with an emotion type of sad. Of course, photos are only one type of content that may be displayed. Content may include, but is not limited to, social networking posts, photos, videos, audio, games, advertisements, or applications made available online or through an application store on a device. Using information associating emotions with content, a content delivery system may deliver more content associated with happy emotions than sad emotions, for example.

Figure 5:
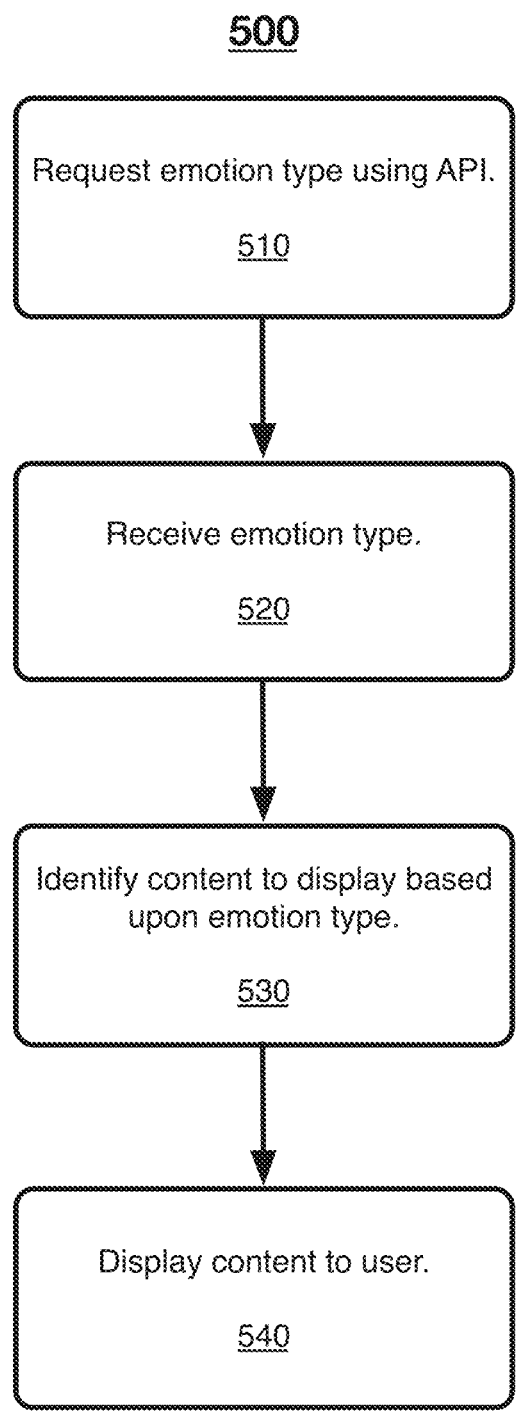
FIG. 5 illustrates a logic flow according to an embodiment.

FIG. 5 illustrates one embodiment of a logic flow 500. The logic flow 500 may be representative of some or all of the operations executed by one or more embodiments described herein. For instance, the logic flow 500 may be representative of some or all of the operations executed by system 100, for example.

At 510, an application may request emotion type information using an API configured to provide an interface between stored emotion type information and one or more applications of a device. An application may receive the requested emotion type at 520.

At 530, an application may access a user profile, or a content storage system, and identify, or request, content to display to a user based upon, in part, the received emotion type. At 540, content may be displayed to the user based upon the received emotion type. For example, if a user has been determined to be bored, funny content may be displayed to the user. Content may be categorized, or tagged, with particular emotion types. For example, content from a known humor website may be automatically or manually categorized as funny. In one example, the provider of content may include an emotion tag to be associated with the content. In an embodiment, detected emotion types from a plurality of users may be used to determine a crowd-sourced emotional response to content. When one or more emotion types from a number of users are detected in response to content, the content may be associated with common emotional responses. For example, when 75% of users experience laughter when viewing an article, the article may be automatically tagged as funny.

In another example, if a user is determined to be attentive, advertisements may be displayed. In yet another example, a user's emotional state may be used to serve advertisements. For example, when a user appears sad, uplifting and happy advertisements may be served to the user. When a user appears bored, interactive advertisements may be served. Advertisements may be automatically categorized, or tagged, as discussed with respect to content above. In addition, advertisements may be manually categorized by a web service responsible for serving the advertisements, or the advertisers may select categories for each advertisement and target emotions for serving the advertisement. In this manner, advertisement delivery may be customized based upon a user's detected emotions.

TABLE 3

User: Desmond Jones

| Content Type | Content Tags | User Tags | Emotion Type |
| --- | --- | --- | --- |
| photos | running | Penny Brown | Happy |
| article | plane crash | News Now | Bored |
| status update | all | Ruth Jones | Sad |
| video | kitten | Tim Boone | Looking away |
| ads | scotch | Scotty Scotch Co. | Looking at device |

Table 3 illustrates an exemplary user profile according to an embodiment. In other embodiments, an association between a received emotion type and content may be stored separately from a user profile, such as within an object association system. In such an object association system, an edge may be created between an object representing content and an object representing an emotion type. As illustrated in Table 3, content has been parsed into type, content tags, user tags, and emotion type. Of course, other information may be used to organize content that has been viewed by a user, such as content identification codes, for example. A user profile may be stored locally on a device using a memory such as memory 102, or using a server, such as server devices 122.

Using a profile such as that illustrated within Table 3, it may be possible for a content delivery system to determine content to display. For example, it appears from the profile that the user, Desmond Jones, was looking away from his device during a kitten video posted by Tim Boone. Thus, a content delivery system may determine to exclude videos of that type in the future. In another example, it appears that the user has watched an advertisement for scotch. Thus, in the future, more advertisements for scotch may be displayed to the user. In yet another example, it appears that the user was happy when viewing a photo from Penny Brown. Thus, in the future, more photos from Penny Brown may be displayed to the user.

Figure 6:
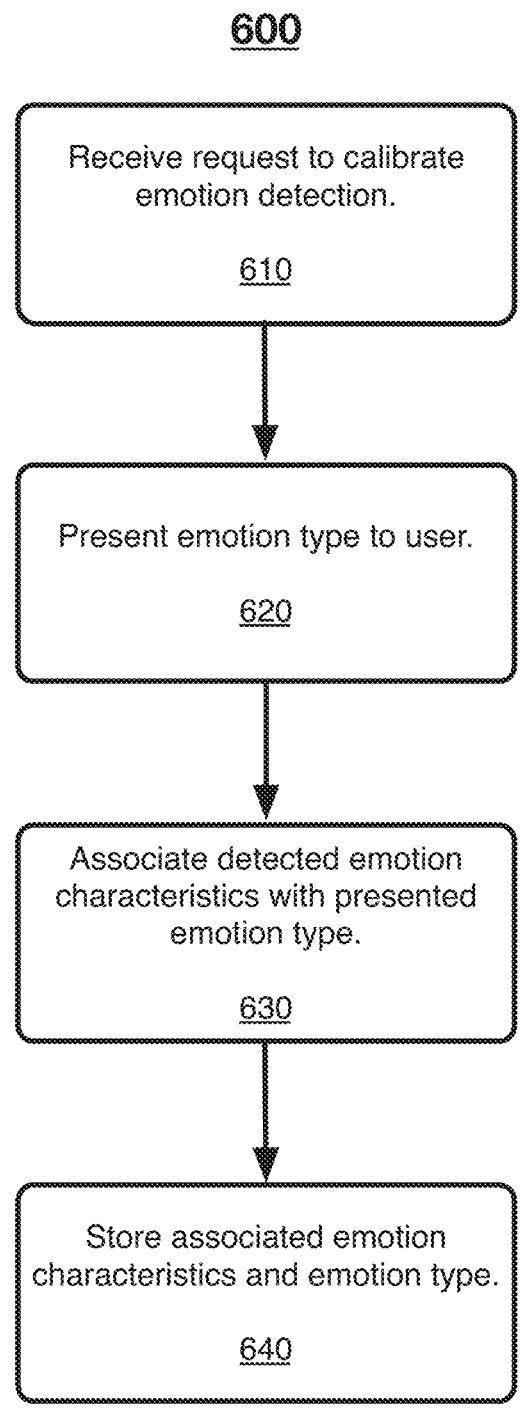
FIG. 6 illustrates a logic flow according to an embodiment.

FIG. 6 illustrates one embodiment of a logic flow 600. The logic flow 600 may be representative of some or all of the operations executed by one or more embodiments described herein. For instance, the logic flow 600 may be representative of some or all of the operations executed by system 100, for example.

At 610, a request to calibrate emotion detection may be received by a calibration component, such as calibration component 116, discussed above. A calibration component may be configured to receive a request to calibrate emotion detection and present a type of emotion to a user. The calibration component may utilize the imaging component and the emotion detection component to detect emotion characteristics and store an association between the presented type of emotion and the detected emotion characteristics in the storage component.

In some embodiments, a calibration component may be included in an operating system, such as operating system 125. A calibration component may be used to calibrate, or fine-tune, emotion detection component. For example, at 620, a calibration component may access a list of emotion types from a storage module and display on a user interface an emotion type. The display may ask a user to express the displayed emotion and an emotion detection component may receive emotion characteristics from an imaging device.

At 630, emotion characteristics may be associated with displayed emotion types in a user profile, which may be stored in local memory or in one or more server devices at 640. In this manner, a user's individual emotion characteristics may be associated with each emotion type, improving the accuracy of an emotion detection component.

TABLE 4

User: Linda Locke

| Detected Emotion Characteristics | Emotion Type |
| --- | --- |
| A, B, N | Happy |
| D, G | Bored |
| C, D, L | Sad |
| E | Looking away |
| F | Looking at device |

As illustrated in exemplary Table 4 above, a variety of detected emotion characteristics may be associated with emotion types during the calibration process. Such a table may be stored as a database, or other data structure, in a storage medium, such as memory 102 or server devices 122. In the exemplary table, detected characteristics have been represented by variables, however, these characteristics may be represented by data structures generated by an emotion detection algorithm. In the example, emotion characteristics A, B, N may indicate a user is happy. Emotion characteristics D, G may indicate boredom while emotion characteristics C, D, L together may indicate sadness. In this manner, a calibration component may associate emotion characteristics detected during calibration with emotion types, which may provide greater accuracy in emotion detection.

Figure 7:
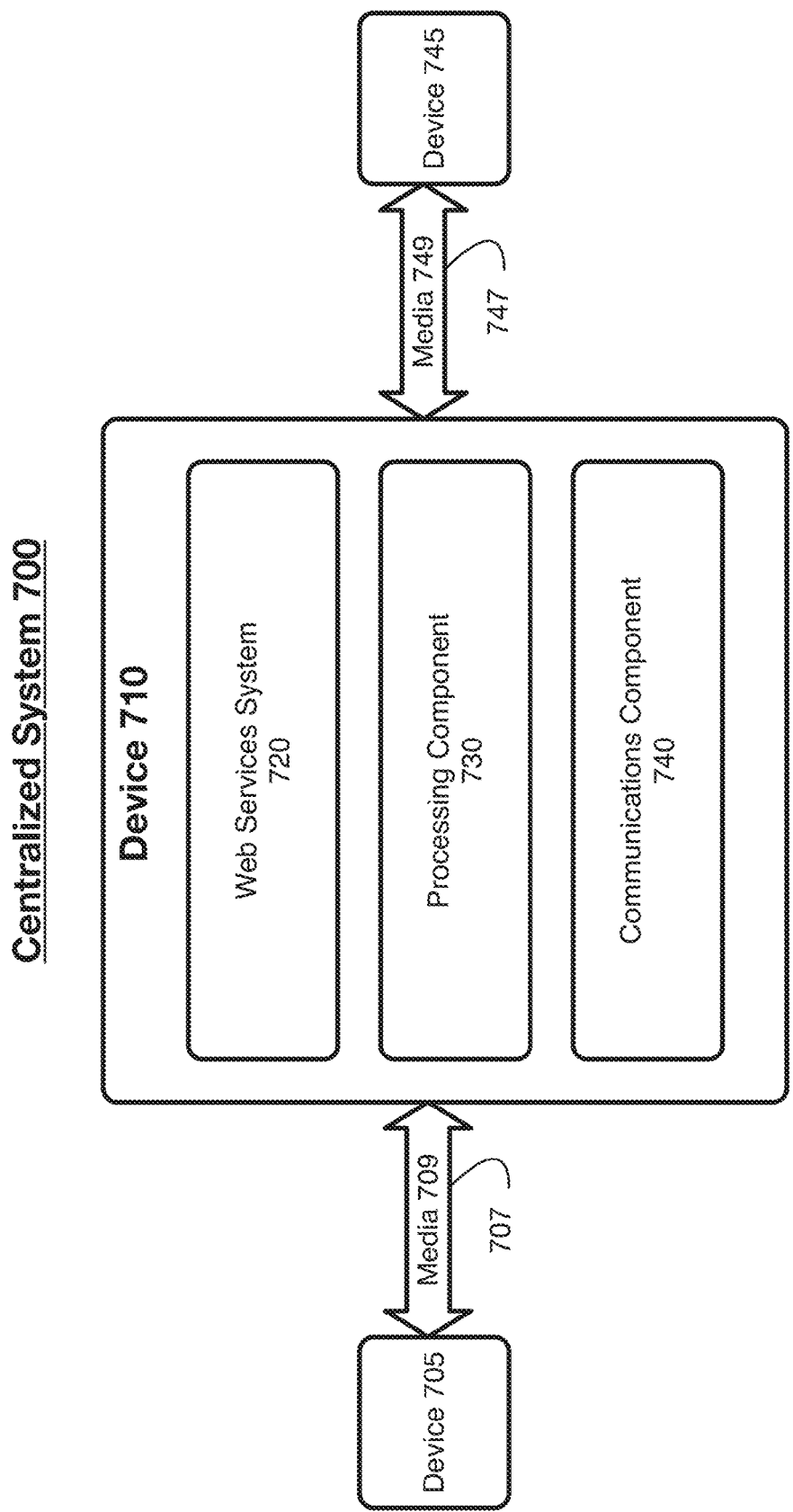
FIG. 7 illustrates an embodiment of a centralized system according to an embodiment.

FIG. 7 illustrates a block diagram of a centralized system 700. The centralized system 900 may implement some or all of the structure and/or operations for the web services system 720 in a single computing entity, such as entirely within a single device 910.

The device 710 may comprise any electronic device capable of receiving, processing, and sending information for the web services system 720. Examples of an electronic device may include without limitation a mobile device, a personal digital assistant (PDA), a mobile computing device, a smart phone, a cellular telephone, ebook readers, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a network appliance, a web appliance, a distributed computing system, multiprocessor systems, processor-based systems, consumer electronics, programmable consumer electronics, game devices, television, set top box, wireless access point, base station, subscriber station, mobile subscriber center, radio network controller, router, hub, gateway, bridge, switch, machine, or combination thereof. The embodiments are not limited in this context.

The device 710 may execute processing operations or logic for the web services system 720 using a processing component 730. The processing component 730 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The device 710 may execute communications operations or logic for the web services system 720 using communications component 740. The communications component 740 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 740 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 709, 749 include wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The device 710 may communicate with other devices 705, 745 over a communications media 709, 749, respectively, using communications signals 707, 747, respectively, via the communications component 740. The devices 705, 745, may be internal or external to the device 710 as desired for a given implementation.

For example, device 705 may correspond to a client device such as a phone used by a user. Signals 707 sent over media 709 may therefore comprise communication between the phone and the web services system 720 in which the phone transmits a request and receives a web page in response.

Device 745 may correspond to a second user device used by a different user from the first user, described above. In one embodiment, device 745 may submit information to the web services system 720 using signals 747 sent over media 749 to construct an invitation to the first user to join the services offered by web services system 720. For example, if web services system 720 comprises a social networking service, the information sent as signals 747 may include a name and contact information for the first user, the contact information including phone number or other information used later by the web services system 720 to recognize an incoming request from the user. In other embodiments, device 745 may correspond to a device used by a different user that is a friend of the first user on a social networking service, the signals 747 including status information, news, images, or other social-networking information that is eventually transmitted to device 705 for viewing by the first user as part of the social networking functionality of the web services system 720.

Figure 8:
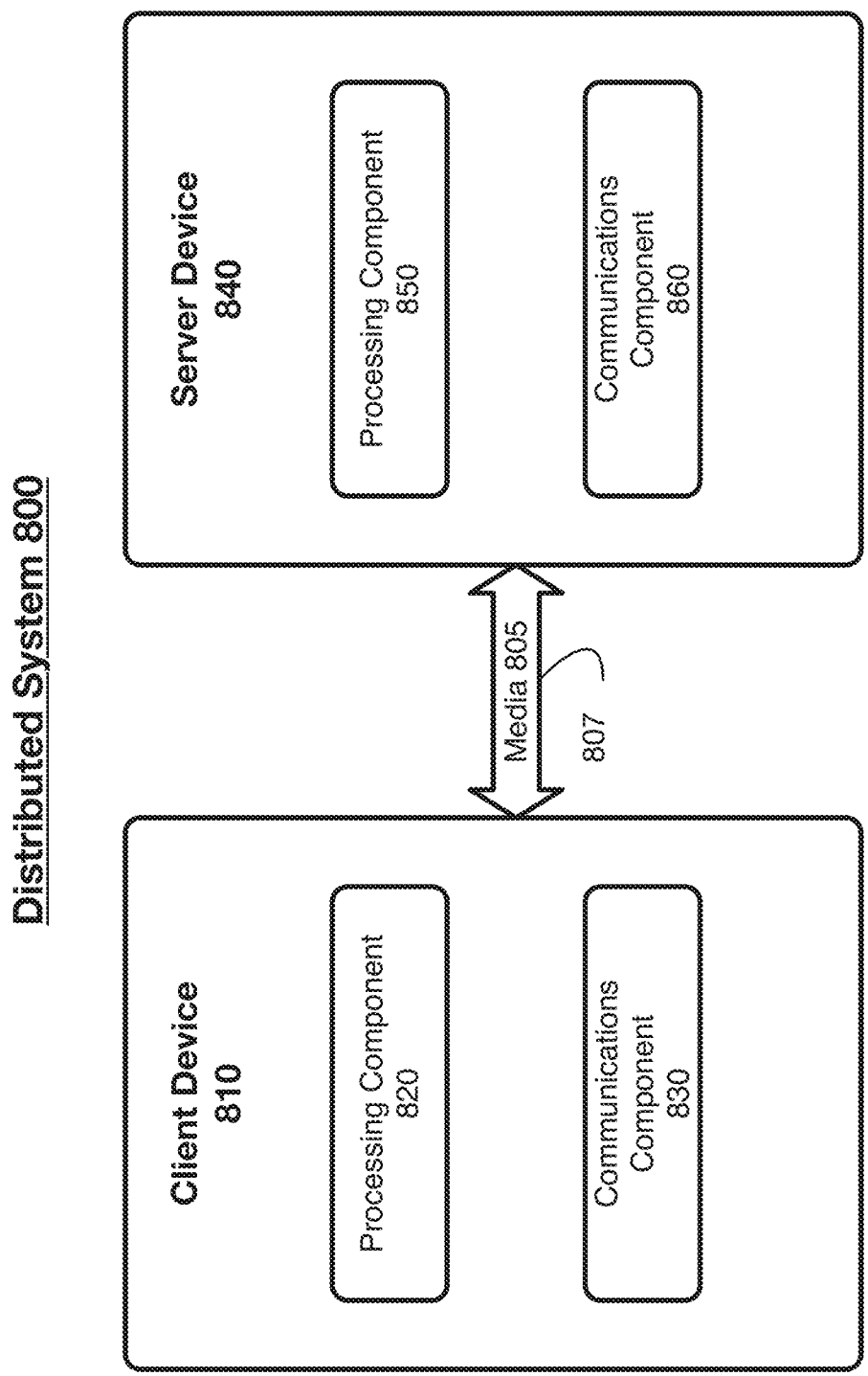
FIG. 8 illustrates an embodiment of a distributed system according to an embodiment.

FIG. 8 illustrates a block diagram of a distributed system 800. The distributed system 800 may distribute portions of the structure and/or operations for the disclosed embodiments across multiple computing entities. Examples of distributed system 800 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 800 may comprise a client device 810 and a server device 840. In general, the client device 810 and the server device 840 may be the same or similar to device 710 as described with reference to FIG. 7. For instance, the client device 810 and the server device 840 may each comprise a processing component 820, 850 and a communications component 830, 860 which are the same or similar to the processing component 730 and the communications component 740, respectively, as described with reference to FIG. 7. In another example, the devices 810 and 840 may communicate over a communications media 805 using media 805 via signals 807.

The client device 810 may comprise or employ one or more client programs that operate to perform various methodologies in accordance with the described embodiments. In one embodiment, for example, the client device 810 may implement some steps described with respect client devices described in the preceding figures.

Figure 9:
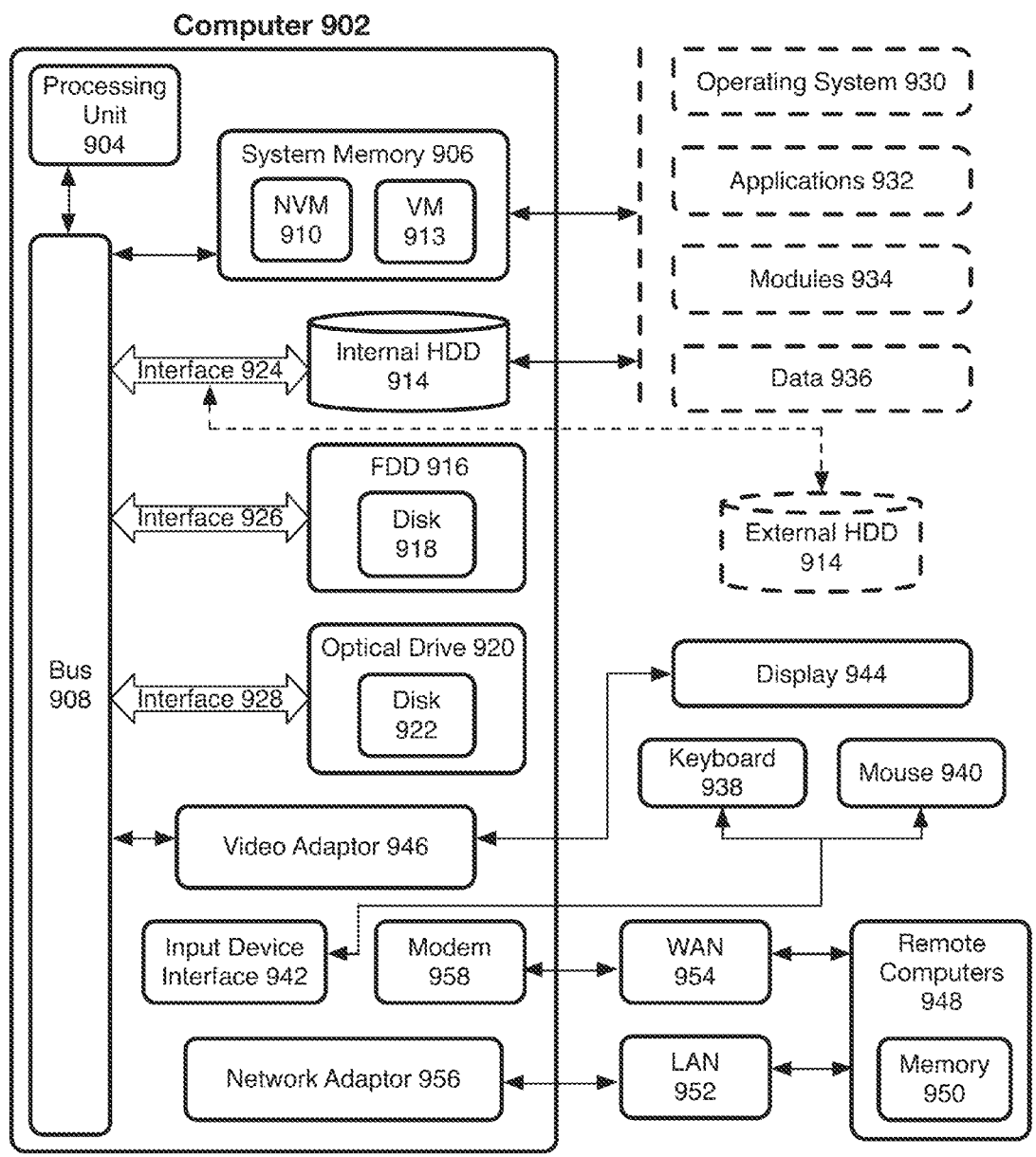
FIG. 9 illustrates an embodiment of a computing architecture.

The server device 840 may comprise or employ one or more server programs that operate to perform various methodologies in accordance with the described embodiments. In one embodiment, for example, the server device 840 may implement some steps described with respect to server devices described in the preceding figures FIG. 9 illustrates an embodiment of an exemplary computing architecture 900 suitable for implementing various embodiments as previously described. In one embodiment, the computing architecture 900 may comprise or be implemented as part of an electronic device. Examples of an electronic device may include those described herein. The embodiments are not limited in this context.

As used in this application, the terms "system" and "component" are intended to refer to a computer-related entity, either hardware, a combination of hardware and software, software, or software in execution, examples of which are provided by the exemplary computing architecture 900. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 900 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 900.

As shown in FIG. 9, the computing architecture 900 comprises a processing unit 904, a system memory 906 and a system bus 908. The processing unit 904 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 904.

The system bus 908 provides an interface for system components including, but not limited to, the system memory 906 to the processing unit 904. The system bus 908 can be any of several types of bus structure that may further interconnect to a memory bus (with or without a memory controller), a peripheral bus, and a local bus using any of a variety of commercially available bus architectures. Interface adapters may connect to the system bus 1108 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 900 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 906 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 9, the system memory 906 can include non-volatile memory 910 and/or volatile memory 913. A basic input/output system (BIOS) can be stored in the non-volatile memory 910.

The computer 902 may include various types of computer-readable storage media in the form of one or more lower speed memory units, including an internal (or external) hard disk drive (HDD) 914, a magnetic floppy disk drive (FDD) 916 to read from or write to a removable magnetic disk 918, and an optical disk drive 920 to read from or write to a removable optical disk 922 (e.g., a CD-ROM, DVD, or Blu-ray). The HDD 914, FDD 916 and optical disk drive 920 can be connected to the system bus 908 by a HDD interface 924, an FDD interface 926 and an optical drive interface 928, respectively. The HDD interface 924 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 910, 913, including an operating system 930, one or more application programs 932, other program modules 934, and program data 936. In one embodiment, the one or more application programs 932, other program modules 934, and program data 936 can include, for example, the various applications and/or components to implement the disclosed embodiments.

A user can enter commands and information into the computer 902 through one or more wire/wireless input devices, for example, a keyboard 938 and a pointing device, such as a mouse 940. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 904 through an input device interface 942 that is coupled to the system bus 908, but can be connected by other interfaces such as a parallel port, IEEE 1394 serial port, a game port, a USB port, an IR interface, and so forth.

A display 944 is also connected to the system bus 908 via an interface, such as a video adaptor 946. The display 944 may be internal or external to the computer 902. In addition to the display 944, a computer typically includes other peripheral output devices, such as speakers, printers, and so forth.

The computer 902 may operate in a networked environment using logical connections via wire and/or wireless communications to one or more remote computers, such as a remote computer 948. The remote computer 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wire/wireless connectivity to a local area network (LAN) 952 and/or larger networks, for example, a wide area network (WAN) 954. Such LAN and WAN networking environments are commonplace in offices and companies, and facilitate enterprise-wide computer networks, such as intranets, all of which may connect to a global communications network, for example, the Internet.

When used in a LAN networking environment, the computer 902 is connected to the LAN 952 through a wire and/or wireless communication network interface or adaptor 956. The adaptor 956 can facilitate wire and/or wireless communications to the LAN 952, which may also include a wireless access point disposed thereon for communicating with the wireless functionality of the adaptor 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wire and/or wireless device, connects to the system bus 908 via the input device interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 10:
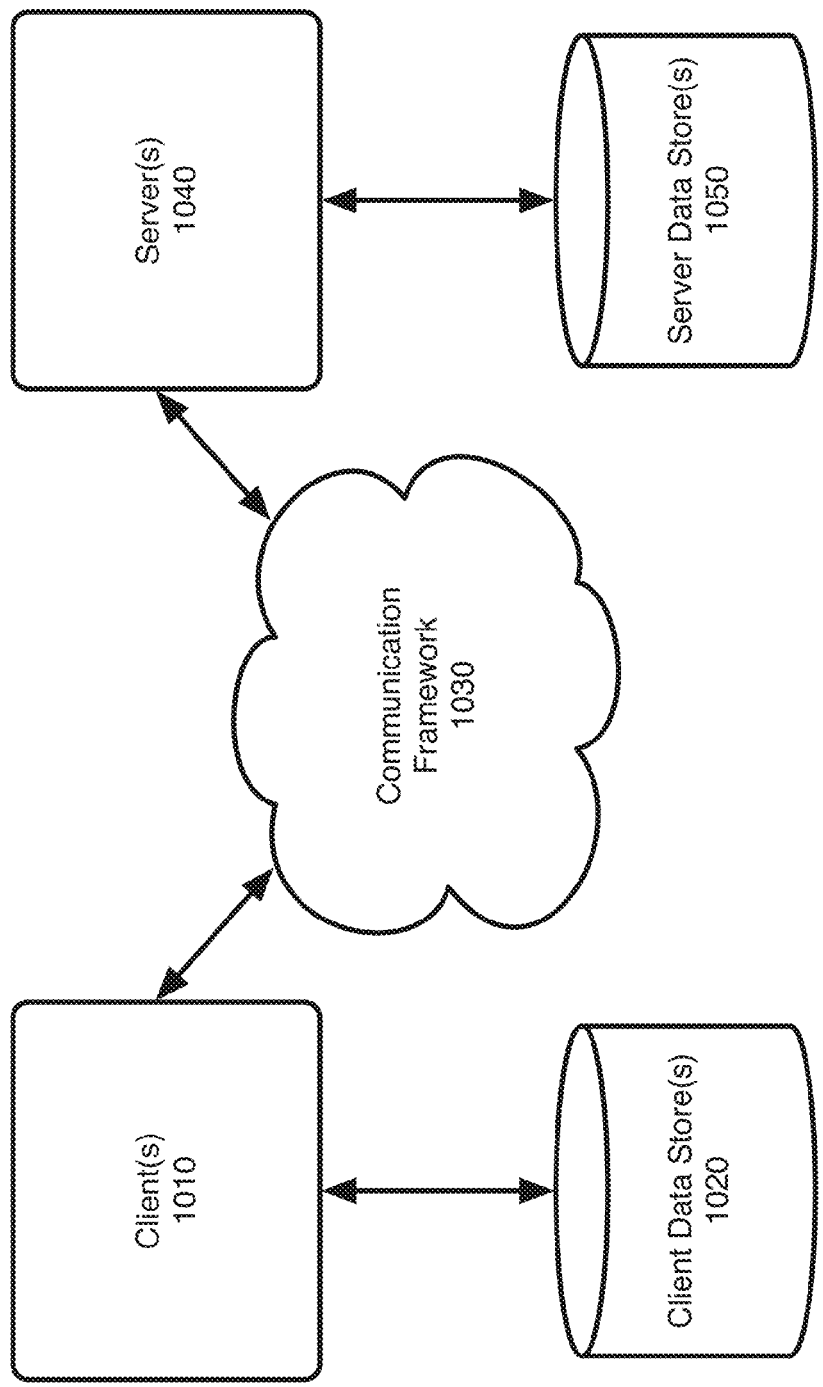
FIG. 10 illustrates an embodiment of a communications architecture.

FIG. 10 illustrates a block diagram of an exemplary communications architecture 1000 suitable for implementing various embodiments as previously described. The communications architecture 1000 includes various common communications elements, such as a transmitter, receiver, transceiver, radio, network interface, baseband processor, antenna, amplifiers, filters, power supplies, and so forth. The embodiments, however, are not limited to implementation by the communications architecture 1000.

As shown in FIG. 10, the communications architecture 1000 comprises includes one or more clients 1010 and servers 1040. The clients 1010 may implement the client device 1010, for example. The servers 1040 may implement the server device 1040, for example. The clients 1010 and the servers 1040 are operatively connected to one or more respective client data stores 1020 and server data stores 1050 that can be employed to store information local to the respective clients 1010 and servers 1040, such as cookies and/or associated contextual information.

The clients 1010 and the servers 1040 may communicate information between each other using a communication framework 1030. The communications framework 1030 may implement any well-known communications techniques and protocols. The communications framework 1030 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1030 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1010 and the servers 1040. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A computer-implemented method, comprising:
receiving a request to calibrate emotion detection by a calibration component;
presenting a type of emotion to a user, the presenting comprising:
accessing a list of emotion types,
displaying an emotion type from the list, and
prompting the user to express the displayed emotion type;
utilizing an imaging component to detect at least one detected emotion characteristic in response to the prompt;
storing an association between the presented emotion type and the detected emotion characteristics in a storage component;
receiving a request from one or more applications for an emotion type by an application programming interface (API) component;
in response to the request, returning the presented emotion type by the API component; and
identifying content for display by the one or more applications based upon the presented emotion type, the content including one or more of social networking posts, social networking photos, social networking videos, social networking audio, social networking advertisements, or social networking applications.

2. The computer-implemented method of claim 1, wherein the identification of content for display by the one or more applications based upon the identified emotion type comprises searching among a plurality of content items, each content item being associated with one or more emotion type.

3. The computer-implemented method of claim 1, further comprising storing an association between content currently being displayed by the one or more applications and the identified emotion type.

4. The computer-implemented method of claim 1, further comprising temporarily storing by the storage component the identified emotion type for a defined period of time.

5. The computer-implemented method of claim 1, further comprising detecting emotion characteristics by an imaging component based upon one or more triggers received from one or more sensors.

6. An article comprising a non-transitory computer-readable storage medium including instructions that, when executed by a processor, cause a system to:
receive a request to calibrate emotion detection by a calibration component;
present a type of emotion to a user, the presenting comprising:
accessing a list of emotion types,
displaying an emotion type from the list, and
prompting the user to express the displayed emotion type;
utilize an imaging component to detect at least one detected emotion characteristic in response to the prompt;
store an association between the presented emotion type and the detected emotion characteristics in a storage component;
receive a request from one or more applications for an emotion type by an application programming interface (API) component;
in response to the request, return the presented emotion type by the API component; and
identify content for display by the one or more applications based upon the presented emotion type, the content including one or more of social networking posts, social networking photos, social networking videos, social networking audio, social networking advertisements, or social networking applications.

7. The article of claim 6, wherein the identification of content for display by the one or more applications based upon the identified emotion type comprises searching among a plurality of content items, each content item being associated with one or more emotion type.

8. The article of claim 6, further comprising instructions that, when executed by a processor, cause a system to store an association between content currently being displayed by the one or more applications and the identified emotion type.

9. The article of claim 6, further comprising instructions that, when executed by a processor, cause a system to temporarily store by the storage component the identified emotion type for a defined period of time.

10. The article of claim 6, further comprising instructions that, when executed by a processor, cause a system to detect emotion characteristics by an imaging component based upon one or more triggers received from one or more sensors.

11. An apparatus, comprising:
a processor circuit;
a storage component configured to store types of emotions;
a calibration component operative on the processor circuit to receive a request to calibrate emotion detection, present a type of emotion to a user, the presenting comprising accessing a list of emotion types, displaying an emotion type from the list, and prompting the user to express the displayed emotion type, utilize an imaging component to detect at least one detected emotion characteristic in response to the prompt, and store an association between the presented type of emotion and the detected emotion characteristics in the storage component; and
an application programming interface (API) component operative on the processor circuit to receive a request from one or more applications for an emotion type and, in response to the request, return the presented emotion type, the one or more applications operative on the processor circuit to identify content for display based upon the presented emotion type, the content including one or more of social networking posts, social networking photos, social networking videos, social networking audio, social networking advertisements, or social networking applications.

12. The apparatus of claim 11, wherein the identification of content for display by the one or more applications based upon the identified emotion type comprises searching among a plurality of content items, each content item being associated with one or more emotion type.

13. The apparatus of claim 11, the one or more applications are operative on the processor circuit to store an association between content currently being displayed by the one or more applications and the identified emotion type.

14. The apparatus of claim 11, the storage component is operative on the processor circuit to temporarily store the identified emotion type for a defined period of time.

15. The apparatus of claim 11, further comprising an imaging component operative on the processor circuit to detect emotion characteristics based upon one or more triggers received from one or more sensors.

* * * * *